Dec. 31, 1968     G. R. YOUNGREN, SR., ET AL     3,419,022
TIRE SIDEWALL CLEANING MACHINE
Filed Aug. 3, 1966                          Sheet 1 of 2

Glen R. Youngren, Sr.
Glen R. Youngren, Jr.
INVENTORS

Glen R. Youngren, Sr.
Glen R. Youngren, Jr.
INVENTORS

United States Patent Office 3,419,022
Patented Dec. 31, 1968

3,419,022
TIRE SIDEWALL CLEANING MACHINE
Glen R. Youngren, Sr., and Glen R. Youngren, Jr., Galesburg, Ill., assignors to Sudzy's, Inc., a corporation of Illinois
Filed Aug. 3, 1966, Ser. No. 569,892
6 Claims. (Cl. 134—45)

ABSTRACT OF THE DISCLOSURE

An assembly for disposition alongside the path of a wheel rolling over a support surface and including spray means with which the wheel is registrable, means operative to sense the presence of the wheel on the surface at a location spaced along the path from the point of registry of the wheel with the spray means and to actuate the spray means, after a predetermined delay, for a predetermined period of operation.

---

This invention relates to a novel and useful tire sidewall cleaning machine and more specifically to a machine adapted to be utilized either individually or in combination with car washing equipment of the semi-automatic or automatic type.

The tire sidewall cleaning machine of the instant invention is constructed in a manner so as to be completely automatic in operation and so as to be operable to automatically clean the sidewalls of the tires of a vehicle as the vehicle moves along a supporting surface at a slow rate of speed.

The main object of this invention is to provide a tire sidewall cleaning machine that will be automatic in operation and operative to clean the sidewalls of the tires of a vehicle in an efficient manner.

Another object of this invention is to provide a sidewall tire cleaning machine including a plurality of stationarily positioned spray head assemblies so positioned relative to each other that a vehicle tire rolling therepast may be fully cleaned by tire cleaning solution sprayed from the spray head assemblies and therefore without benefit of mechanical means for supporting and rotating the associated tire about a substantially stationary axis relative to the spray head means.

Yet another object of this invention is to provide a tire sidewall cleaning machine including no moving parts directly associated with the tire cleaning process and which will be capable of fully cleaning the sidewall of a tire rolling slowly past the sidewall cleaning portions of the machine.

A final object of this invention to be specifically enumerated herein is to provide a tire sidewall cleaning machine in accordance with the preceding objects which will conform to conventional forms of manufacture, be of simple construction and easy to use so as to provide a device that will be economically feasible, long lasting and relatively trouble-free in operation.

These together with other objects and advantages which will become subsequenty apparent reside in the details of construction and operation as more fully hereinafter described and claimed, reference being had to the accompanying drawings forming a part hereof, wherein like numerals refer to like parts throughout, and in which:

Figure 1:
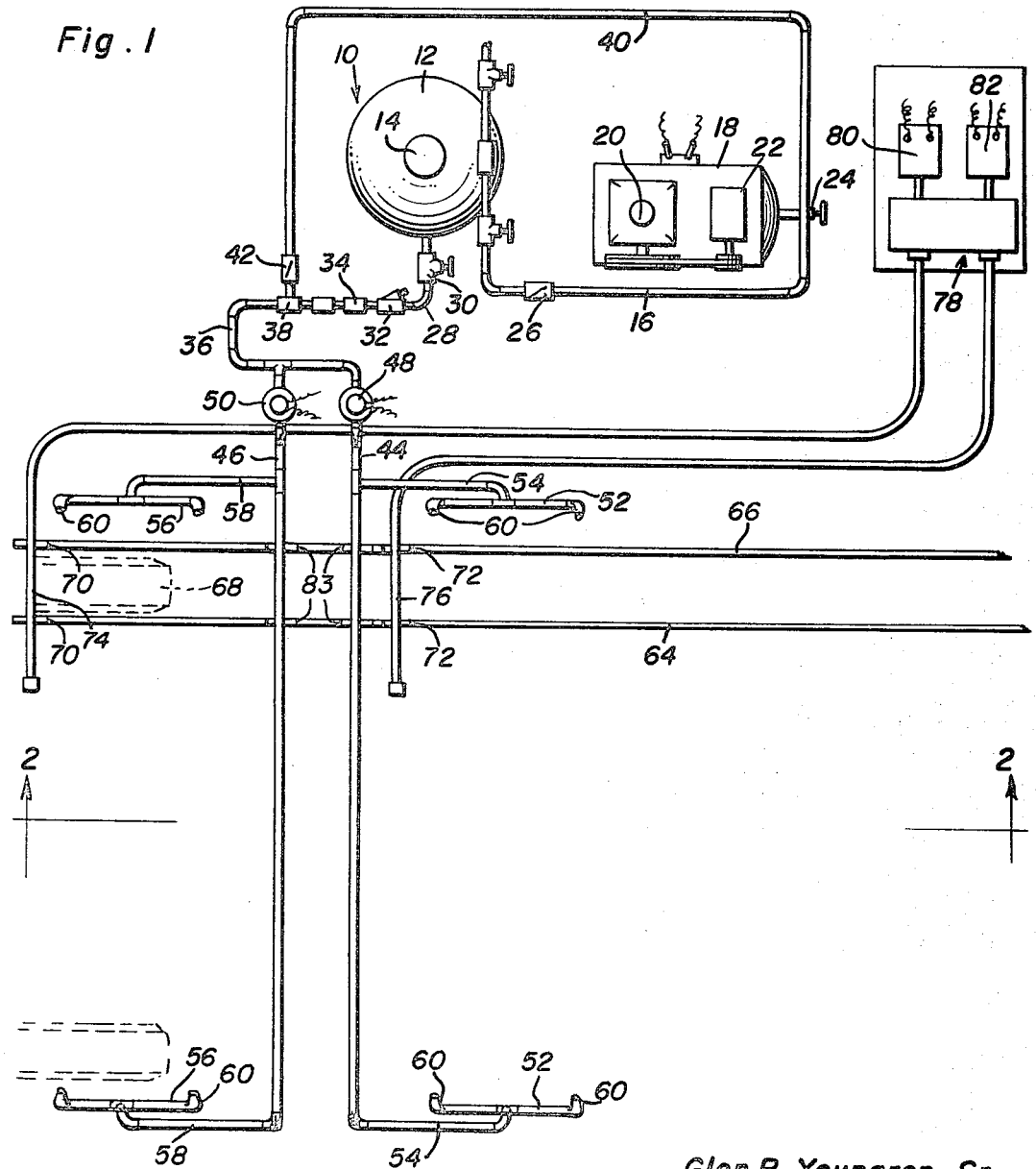
FIGURE 1 is a top plan view of the sidewall cleaning machine of the instant invention with the front wheels of a vehicle being moved into position for cleaning by the machine illustrated in phantom lines.
Figure 2:
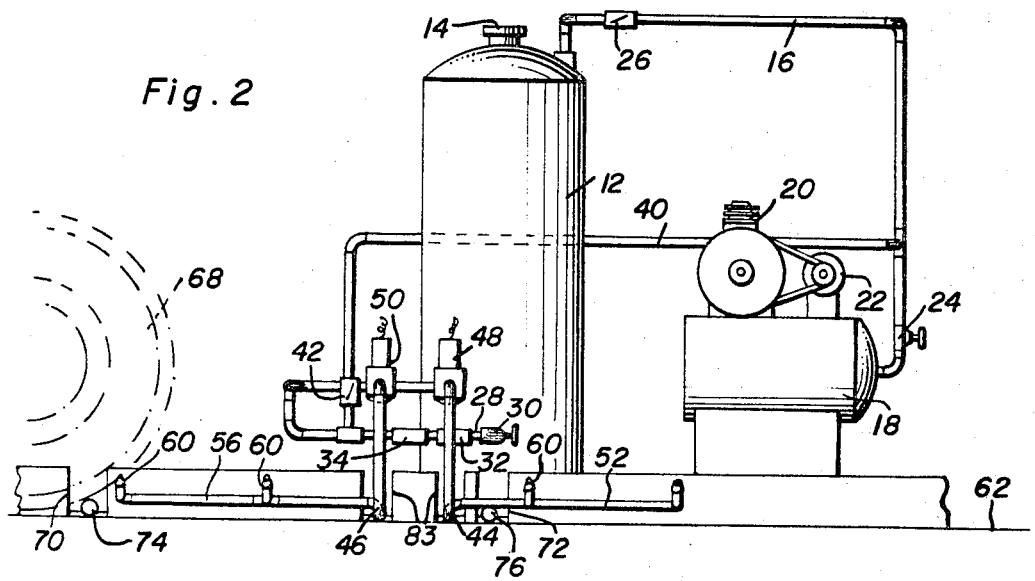
FIGURE 2 is a fragmentary vertical sectional view taken substantially upon the plane indicated by the section line 2—2 of FIGURE 1.
Figure 3:
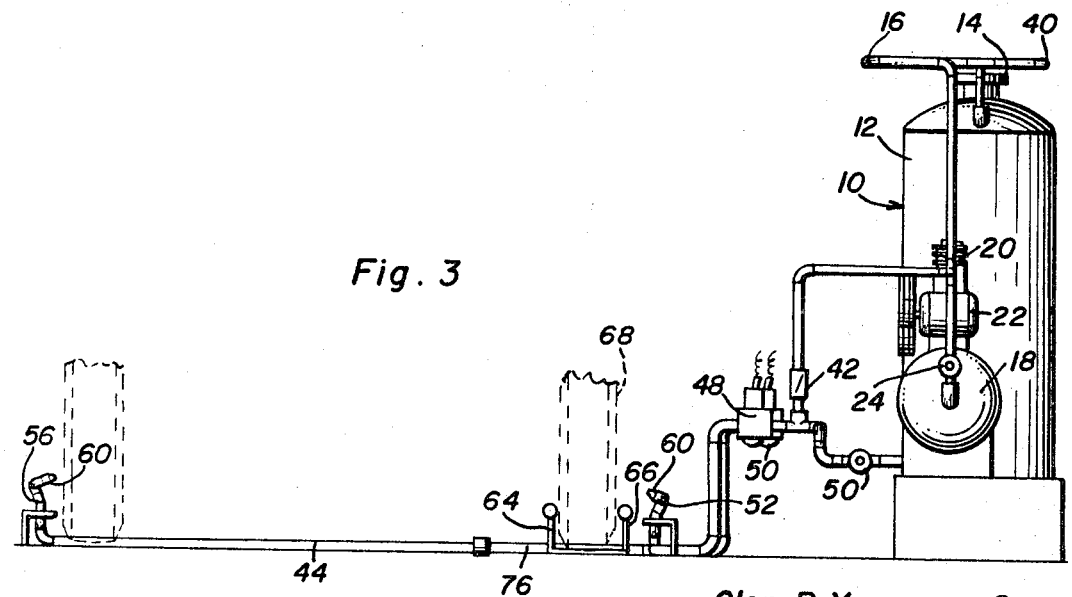
FIGURE 3 is an end elevational view of the machine as seen from the left side of FIGURE 1.

Referring now more specifically to the drawings, the numeral 10 generally designates the tire cleaning machine of the instant invention. The machine 10 includes a supply tank 12 for a tire cleaning solution which may be pressurized and which includes a removable filler cap 14. The interior of the tank 12 is maintained under pressure by means of air under pressure supplied to the interior of the top portion thereof through an air pressure line 16 operatively connected to an air tank 18 receiving air under pressure from a compressor 20 driven by means of a motor 22. The line or conduit 16 may be provided with a suitable control valve 24 and is also provided with an air pressure regulator 26 disposed downstream of the control valve 24 for regulating the pressure of air within the upper portion of the interior of the tank 12. Further, it is to be noted that the motor 22 may be operatively connected to any suitable source of electrical potential by means of a pressure sensitive switch (not shown) operatively communicated with the interior of the tank 18 so as to enable the compressor 20 to maintain a general level of air pressure within the tank 18.

The solution tank 12 is provided with a solution outlet line 28 having a control valve 30, a line strainer 32 and a flow control valve 34 disposed therein. The line 28 has its outlet end communicated with a delivery line 36 by means of a combined T-fitting and air mix assembly 38. In addition, an air conduit or pipe 40 having its inlet end communicated with the line 16 and therefore also tank 18 has its outlet end communicated with the T-fitting and air mix assembly 38 and has an air pressure regulator 42 disposed therein.

The delivery line 36 has a pair of header lines 44 and 46 communicated therewith through solenoid actuated control valve assemblies 48 and 50, respectively. The header line 44 has a pair of spray heads 52 communicated therewith by means of a pair of branch lines 54 and the header line 46 has a pair of spray heads 56 communicated therewith by means of a pair of branch lines 58. The spray heads 52 and 56 each include a pair of spray nozzles 60.

The machine 10 is adapted to be disposed adjacent a supporting surface 62 over which a vehicle including tires which are to be cleaned may roll. A pair of upstanding generally parallel tire guiding members 64 and 66 are suitably supported from the supporting surface 62 and are adapted to embracingly receive therebetween the corresponding front tire 68 of an associated vehicle. The tire guiding members 64 and 66 are notched as at 70 and 72 and receive therethrough corresponding ends of a pair of sealed resilient tubular members 74 and 76, respectively, filled with fluid under pressure and having their other pair of corresponding ends operatively communicated with a compound pressure switch assembly generally referred to by the reference numeral 78. The latter is operative to actuate the time delay and timing mechanisms 80 and 82 for electrically connecting the solenoid actuated valve assemblies 50 and 48 to a suitable source of electrical potential for a predetermined length of time after a time delay of a predetermined interval preceding compression of the tubular members 74 and 76 caused by the tires 68 rolling thereover. Further, the members 64 and 66 are also notched as at 83 to receive therethrough the lines 44 and 46.

It is of course to be noted that the switch assembly 78, time delay and timing mechanisms 80 and 82 as well as the solenoid actuated valve assemblies 50 and 48 are of conventional design. In addition, it will be noted that the nozzles 60 carried by each of the spray heads are positioned so as to spray approximately one half of the sidewall of an associated tire rolling therepast. In addition, the spacing between the spray heads 52 and 56 is such that first one half of the associated tire will be sprayed by the nozzles 60 carried by the spray head 56 and then the other half of the associated tire will be sprayed by the spray nozzles 60 of the associated spray head 52. Accordingly, it may be seen that the stationarily supported spray heads 52 and 56, combined with the spacing therebetween, are operative to spray the entire outer surface of an associated tire so as to clean the sidewall of that tire. Thus, the machine 10 of the instant invention does away with any necessity of driven mechanical assemblies for causing a scrubbing element to move in contact with the tire to be cleaned or causing an associated tire to be rapidly spun while in registry with a spray head. Therefore, the only moving parts of the instant invention comprise the conventional compressor and motor units 20 and 22, the solenoid actuated valve assemblies 48 and 50, the pressure sensitive switch assembly 78 and the time delay and timing mechanisms 80 and 82, all of which components are readily available and are dependable in operation thus resulting in an extremely dependable and efficient tire sidewall cleaning machine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tire sidewall cleaning machine including spray head means adapted to be supported slightly above a supporting surface and in position to discharge a generally horizontal spray, a source of cleaning solution under pressure, conduit means communicating said source with said spray head means, said conduit means including valve means operative to control the flow of solution therethrough, and valve controlling actuating means operatively associated with said valve means and adapted to be actuated by movement of a wheel over said surface in a direction extending laterally of said spray adjacent said spray head means for opening said valve means as said wheel moves in registry with said spray head means, said valve controlling actuating means including sealed fluid filled and resilient conduit means adapted to be disposed on said supporting surface so as to extend across the path of movement of said wheel and operatively connected to a pressure resistive switch operatively connected to said valve means for opening the latter responsive to an increase of fluid pressure in said resilient conduit, said resilient conduit being adapted to extend across the path of said wheel at a location disposed a spaced distance from the point of registry of said wheel with said spray head means on the approach side of said spray head means, said pressure sensitive switch being operatively connected to said valve means through a time delay timing mechanism operative to delay actuation of said valve means a predetermined length of time after an increase in pressure within said resilient conduit is realized and to thereafter open said valve for a predetermined time period.

2. The combination of claim 1 wherein said machine also includes a source of air under pressure and second conduit means communicating said source of air under pressure with the first-mentioned conduit means upstream of said valve means.

3. The combination of claim 1 wherein said spray head means includes a pair of spray head assemblies adapted to spray, simultaneously, corresponding wheels on opposite sides of a vehicle moving in said direction over said supporting surface.

4. The combination of claim 1 including elongated guide means adapted to be secured to said surface along the path of intended movement of said wheel across said surface and including portions adapted to be engaged by said wheel for guiding the latter during its movement in said direction.

5. A tire sidewall cleaning machine including spray head means adapted to be supported slightly above a supporting surface and in position to discharge a generally horizontal spray, a source of cleaning solution under pressure, conduit means communicating said source with said spray head means, said conduit means including valve means operative to control the flow of solution therethrough, and valve controlling actuating means operatively associated with said valve means and adapted to be actuated by movement of a wheel over said surface in a direction extending laterally of said spray adjacent said spray head means for opening said valve means as said wheel moves in registry with said spray head means, said machine including additional second spray head means, additional conduit means communicating said second spray head means with said source of solution under pressure provided with additional valve means for said additional conduit means, and additional valve controlling actuating means for said additional valve means adapted to be actuated after the first-mentioned actuating means by movement of said wheel over said surface, each of said spray head means being adapted to spray approximately half of said wheel and being spaced apart in said direction a distance adapted to approximate one half the circumference of said wheel.

6. The combination of claim 5 wherein said machine also includes a source of air under pressure and second conduit means communicating said source of air under pressure with the first-mentioned conduit means upstream of said valve means.

References Cited

UNITED STATES PATENTS

| 1,540,743 | 6/1925 | Badaracco | 134—123 XR |
| 2,761,170 | 9/1956 | Bonneau | 134—45 XR |
| 2,807,271 | 9/1957 | Spinner | 134—45 |
| 2,987,067 | 6/1961 | Vani et al. | 134—102 |
| 3,079,935 | 3/1963 | Padek | 134—45 |
| 3,147,135 | 9/1964 | Brown | 134—123 XR |
| 2,822,564 | 2/1958 | Crivelli | 134—45 XR |

ROBERT L. BLEUTGE, *Primary Examiner.*

U.S. Cl. X.R.

134—102